(12) United States Patent
Yamada

(10) Patent No.: US 6,336,100 B1
(45) Date of Patent: *Jan. 1, 2002

(54) ONLINE SHOPPING SYSTEM

(75) Inventor: Koji Yamada, Yokohama (JP)

(73) Assignee: Victor Company of Japan, Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,442

(22) Filed: Jan. 29, 1998

(30) Foreign Application Priority Data

Jan. 30, 1997 (JP) .............................................. 9-033144

(51) Int. Cl.[7] .............................................. G06F 17/60
(52) U.S. Cl. .......................................... 705/26; 705/27
(58) Field of Search ........................... 705/1, 14, 25–29

(56) References Cited

U.S. PATENT DOCUMENTS

| 5,826,242 | A | * | 10/1998 | Montulli | 705/27 |
| 5,848,399 | A | * | 12/1998 | Burke | 705/27 |
| 5,890,137 | A | * | 3/1999 | Koreeda | 705/26 |
| 5,897,622 | A | * | 4/1999 | Blinn et al. | 705/26 |
| 5,983,200 | A | * | 4/1999 | Slotznick | 705/26 |
| 5,970,472 | A | * | 10/1999 | Allsop et al. | 705/26 |

FOREIGN PATENT DOCUMENTS

| JP | 4031355692 A | * | 6/1991 |
| JP | 408030847 A | * | 2/1996 |
| JP | 408166992 A | * | 6/1996 |

OTHER PUBLICATIONS

Medilife Inc, "Virtual shoppers soon to buy online drugs", Drug Store News, v 18, n 17, P 3. Oct. 21, 1996.*
Andrew Don, "Frozen and Chilled Foods", Magazine/Journal; Trade, P 11. Jan. 1997.*
Cooke, James Aaron, "point, click, and shop", (Internet Retailing), (Logistics Technology), Logistics Management, v36, n2, p70S (3), Feb. 1997.*

* cited by examiner

Primary Examiner—Vincent Millin
Assistant Examiner—Hani M. Kazimi
(74) Attorney, Agent, or Firm—Anderson, Kill & Olick, P.C.

(57) ABSTRACT

An online shopping system has a server, at least one virtual store provided on the server and a plurality of pieces of customers terminal equipment electrically connected to the server. Each customer's order for at least one commodity being sold by the virtual store is made by the terminal equipment to the server. At least a place where the commodity is kept temporarily such as a 24-hour opened convenience store is selected as a place where the commodity should be delivered when the order is made.

12 Claims, 8 Drawing Sheets

```
                    MEMBER PROFILE

NAME              _____

E-MAIL ADDRESS    _____

HOME ADDRESS      _____

TEL & FAX NO.     _____

OFFICE ADDRESS    _____

TEL & FAX NO.     _____
```

FIG. 3

STATION SETTING

STATIONS ALREADY SET

STATION 1

STORE          _____
ADDRESS        _____
TEL            _____

STATION 2

STORE          _____
ADDRESS        _____
TEL            _____

WHEN SETTING NEW STATION OR CHANGING

STATION 1 AND/OR 2, SELECT ONE STATE WHERE

STATION 1 AND/OR 2, ARE/IS LOCATED AND CLICK "SET".

| ARKANSAS | NEW HAMPSHIRE |
| IOWA | NEW MEXICO |
| IDAHO | ■ NEW YORK |
| ⋮ | ⋮ |
| NEW JERSEY | WASHINGTON |

SET

FIG. 4

STATION SETTING (AREA SETTING)

NEW YORK

SELECT ONE AREA WHERE STATION 1 OR 2

IS LOCATED AND CLICK "STATION LIST"

BRONK

BROOKLYN

■ MANHATTAN

QUEENS

STATEN I.

| STATION LIST |

FIG. 5

STATION SETTING (STATION SELECTING)

MANHATTAN

SELECT ONE STATION AND CLICK "STATION 1 OR 2"

■ _____ 160 CENTRAL PARK S. ON 59ST.

■ _____ 790 7TH AVE. ON 53ST.

_____ 301 PARK AVE. ON 50ST.

_____ 37E. 64ST.

⋮

| STATION 1 |  | STATION 2 |

FIG. 6

```
                    STORE LIST

COMPUTER

FASHION

MUSICAL   CD

■ OUTDOOR  GEAR
```

```
                   MILITARY KNIFE
```

| SHOPPING LIST | | | |
|---|---|---|---|
| ITEM NO. | ITEM | PRICE | AMOUNT |
| BO29-00 | MILITARY KNIFE | $ XX.XX | 1 |

SELECT PLACE WHERE TO DELIVER

| STATION 1 | 160 CENTRAL PARK S. ON 59ST. |
|---|---|
| STATION 2 | 790 7TH AVE. ON 53ST. |
| HOME | 15 CENTRAL PARK W. |
| OFFICE | 811 7TH AVE. ON 52 ST. |
| OTHER | |

FIG. 9

DELIVERY STATEMENT

STATION 1     ORDER

| ITEM NO. | ITEM | PRICE | AMOUNT | TOTAL |
|---|---|---|---|---|
| BO29-00 | MILITARY KNIFE | $ XX.XX | 1 | $ XX.XX |
| | | TRANSPORT | TAX | GRAND TOTAL |
| | | $ XX.XX | $ XX.XX | $ XX.XX |

FIG. 10

| | |
|---|---|
| ORDER NO. | 199801050001019 |
| COMMODITY TOTAL | $ XX.XX |
| TRANSPORT | $ XX.XX |
| TAX | $ XX.XX |
| GROUND TOTAL | $ XX.XX |

CHECK SUIM, ENTER PASSWORD
AND CLICK "ORDER"

[ORDER]

PASSWORD * * * * * * *  [CANCEL]

FIG.11

RECEIPT NO.  17128000000329

ORDER COMPLETE.

RECORD RECEIPT NO. FOR ORDER CHECK.

THANK YOU.

ONLINE SHOPPING SYSTEM

BACKGROUND OF THE INVENTION

The present invention relates to an online shopping system.

Online shopping systems have become popular rapidly with development of internet or other communications systems with personal computers in addition to conventional mail order in which a customer chooses goods from catalogues at home, for instance.

In the online shopping systems, goods are mostly directly delivered by home delivery services to customers' home addresses or customers' designated addresses such as company addresses and other addresses.

SUMMARY OF THE INVENTION

A purpose of the present invention is to provide an online shopping system in which a customer can designate addresses or places where he or she wants to have goods delivered.

The present invention provides an online shopping system comprising: a server; at least one virtual store provided on the server; and a plurality of pieces of customers' terminal equipment electrically connected to the server, each customer's order for at least one commodity being sold by the virtual store being made by the terminal equipment to the server, at least a place where the commodity is kept temporarily being selectable as a place where the commodity should be delivered when the order is made.

Further, the present invention provides an online shopping system comprising: a server; at least one virtual store provided on the server; and a plurality of pieces of customers' terminal equipment electrically connected to the server, each customer's order for at least one commodity being sold by the virtual store being made by the terminal equipment to the server, order information transmitted from the terminal equipment to the server when the order is made including delivery information indicating at least either one of each customer's place of residence, customer's designated place, a place where the commodity is kept temporarily or each customer's designated person's place of residence as a place where the commodity should be delivered.

BRIEF DESCRIPTION OF DRAWINGS

FIG. 3 illustrates a display of a member profile on the screen of a customer's terminal equipment;

FIG. 4 illustrates a display of station setting on the screen of the customer's terminal equipment;

FIG. 5 illustrates another display of the station setting on the screen of the customer's terminal equipment;

FIG. 6 illustrates still another display of the station setting on the screen of the customer's terminal equipment;

FIG. 9 illustrates a display of a shopping list on the screen of the customer's terminal equipment;

FIG. 10 illustrates a display of a delivery statement on the screen of the customer's terminal equipment;

FIG. 11 illustrates a display of an order statement on the screen of the customer's terminal equipment; and FIG. 12 illustrates a display of a receipt on the screen of the customer's terminal equipment.

DETAILED DESCRIPTION OF PREFERRED EMBODIMENT

A preferred embodiment of the present invention will be disclosed with reference to the attached drawings.

Figure 1:
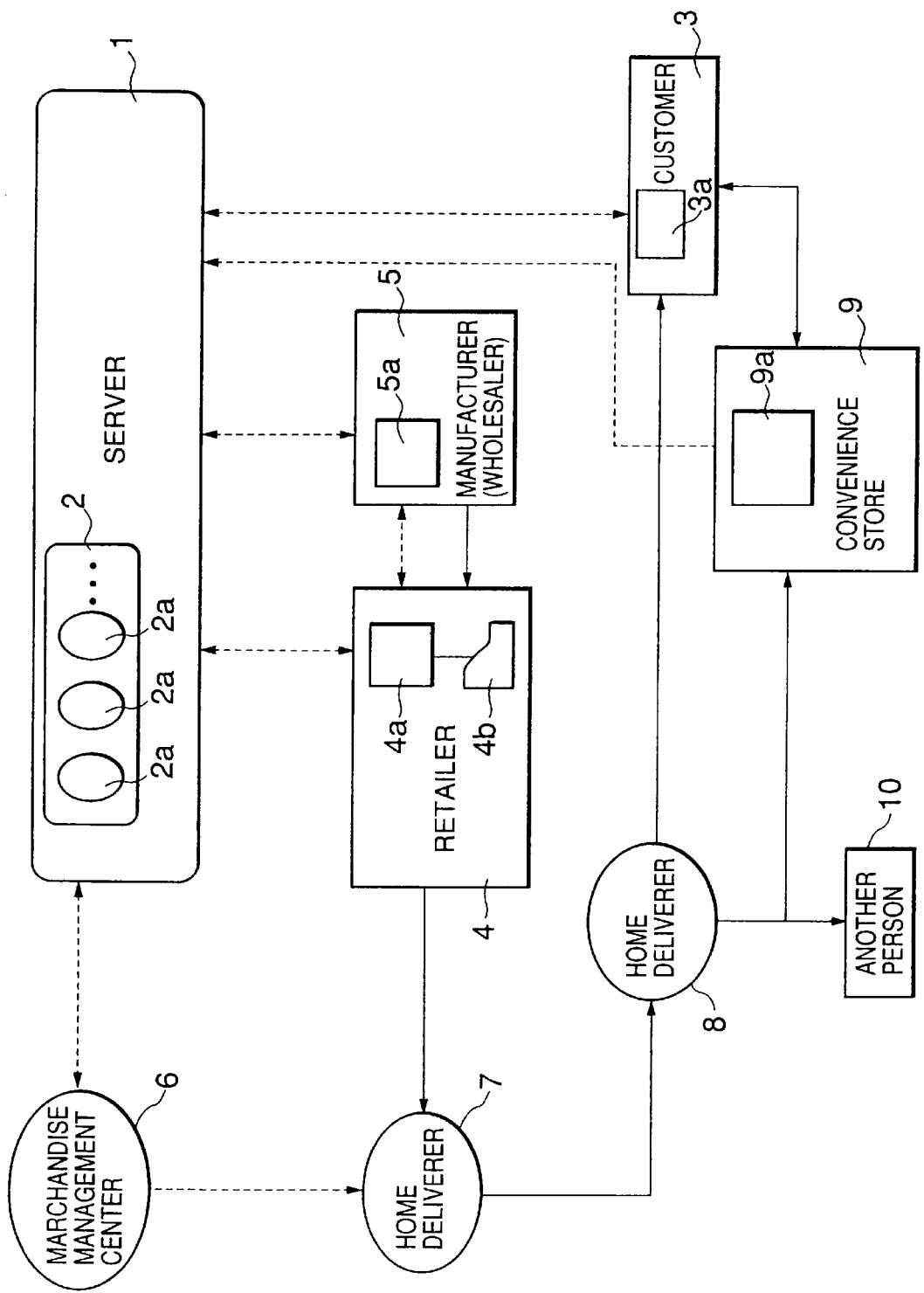
FIG. 1 is a diagrammatic view of a preferred embodiment of the online shopping system according to the present invention.

FIG. 1 is a diagrammatic view of the embodiment that illustrates a flow of information and commodity delivery in the online shopping system according to the present invention. In the figure, the flow of information is indicated by dotted lines, while the flow of the commodity delivery is indicated by solid lines.

In FIG. 1, a numeral 1 indicates a server of an online shopping service provider. Provided on the server 1 is a shopping mall 2 with a plurality of virtual stores 2a. The shopping mall 2 and the stores 2a are imaginarily composed in the server 1 by means of a main frame, a program running on the mainframe and peripheral equipment such as an external storage device (not shown).

A numeral 3 indicates a customer 3 with a piece of terminal equipment 3a. The terminal equipment 3a is generally installed in the customer's place of residence and is provided with a hardware such as a personal computer, and a program running on the personal computer (not shown). FIG. 1 shows only one customer 3 and a piece of terminal equipment 3a. However, actually there are many customers 3 each owning a piece of terminal equipment 3a. And, all the customers have gained entry to the online shopping system.

A numeral 4 indicates a retailer who owns the virtual stores 2a. The retailer 4 is provided with a piece of terminal equipment 4a. The retailer 4 has entered into a contract with the online shopping service provider to open the virtual stores 2a on the server 1.

A numeral 5 indicates a manufacturer or wholesaler who supplies the retailer 4 with commodities. The manufacturer or wholesaler 5 is provided with a piece of terminal equipment 5a.

A numeral 6 indicates a merchandise management center that designates a home deliverer 7 closest to the retailer 4 when the center 6 accepts commodity delivery information from the server 1. The merchandise management center 6 further sends an order to the home deliverer 7 to take a commodity from the retailer 4.

A numeral 8 indicates another home deliverer 8 who is supplied with the commodity from the home deliverer 7 and delivers the commodity to the place where the customer 3 has designated. A numeral 9 indicates a 24-hour opened convenience store closest to the place of residence of the customer 3. The convenience store 9 is provided with a piece of terminal equipment 9a.

In operation of the online shopping system shown in FIG. 1, firstly, the online shopping service provider records member discriminating information that discriminates account settlement systems and members (customers 3) under the online shopping system from each other. Further, the online shopping service provider issues ID cards storing the member discriminating information to the members when customers 3 become the members of the online shopping system.

When the buyer 3 buys a commodity via the terminal equipment 3a in the online shopping system, the customer 3 transmits order information to the server 1. The order information includes the member discriminating information, commodity order information, commodity amount information and delivery information that indicates a place the ordered commodity should be delivered.

As for the delivery information, the customer 3 selects his or her place of residence, a place (station) where the commodity is kept temporarily such as the 24-hour opened convenience store 9 closest to the place of residence of the customer 3 or a place of residence of another person 10 such as a friend of the customer 3 in case of a gift from the customer 3 to the person 10.

The server 1 transmits the received order information to the terminal equipment 4a and 5a and another piece of information to the merchandise management center 6. The latter information indicates the date and time when the customer 3 will take the commodity and the designated retailer 4.

On receiving the order information, the retailer 4 orders the commodity to the manufacturer or wholesaler 5 via communication between the terminal equipment 4a and 5a. Further, the retailer 4 prints out a statement of delivery indicating necessary information such as the delivery information by the printer 4b.

In response to the order information, the manufacturer or wholesaler 5 delivers the commodity to the retailer 4.

The retailer 4 passes the commodity with the delivery statement to the home deliverer 7 who has received the order from the merchandise management center 6 to take the commodity.

The home deliverer 7 then passes the commodity to the home deliverer 8 who is closest to the place of residence of the customer 3. The home deliverer 8 checks the delivery information and deliverers the commodity to the place where the commodity should be delivered.

More in detail, the home deliverer 8 delivers the commodity to the place of residence of the customer 3 when it is indicated on the delivery information. Or, the home deliverer 8 delivers the commodity to the 24-hour opened convenience store 9 closest to the place of residence of the customer 3 when it is indicated on the delivery information.

The merchandise management center 6 transmits date information to the server 1. The date information indicates when the commodity has been delivered to the convenience store 9. The server 1 then transmits the date information to the terminal equipment 3a of the customer 3.

When the delivery information indicates the person 10 to whom the commodity is to be presented, the home deliverer 7 passes the commodity to another home deliverer (8) closest to the place of residence of the person 10. The closest home deliverer then delivers the commodity to the place of residence of the person 10.

The customer 3 then confirms using the terminal equipment 3a in communication with the server 1 that the commodity has been delivered to the 24-hour opened convenience store 9 when the customer 3 has ordered the commodity with designation of the convenience store 9 as the place where the commodity should be delivered. The customer 3 thus can take the commodity at the 24-hour opened convenience store 9 at any time. The delivery confirmation may be done in communication of the terminal equipment 9a of the convenience store 9 and the terminal equipment 3a of the customer 3.

A shop assistant of the convenience store 9 collates member discriminating information recorded on the ID card of the customer 3 with member discriminating information indicated on the delivery statement attached to the commodity and passes the commodity to the customer 3.

As disclosed above, according to the online shopping system of the present invention, when a customer designates a 24-hour opened convenience store closest to the customer's place of residence as a place where he or she wants to have the commodity delivered, a home deliverer will deliver the commodity to the convenience store not the customer's place of residence. And, the customer 3 can get the commodity at any time at the 24-hour opened convenience store. Therefore, it never happens that the home deliverer has to redeliver the commodity to the customer 3 that would have occurred due to the absence of the customer 3.

The online shopping by the customer 3 with the terminal equipment 3a will be disclosed in detail with reference to FIGS. 2 to 12.

Figure 2:
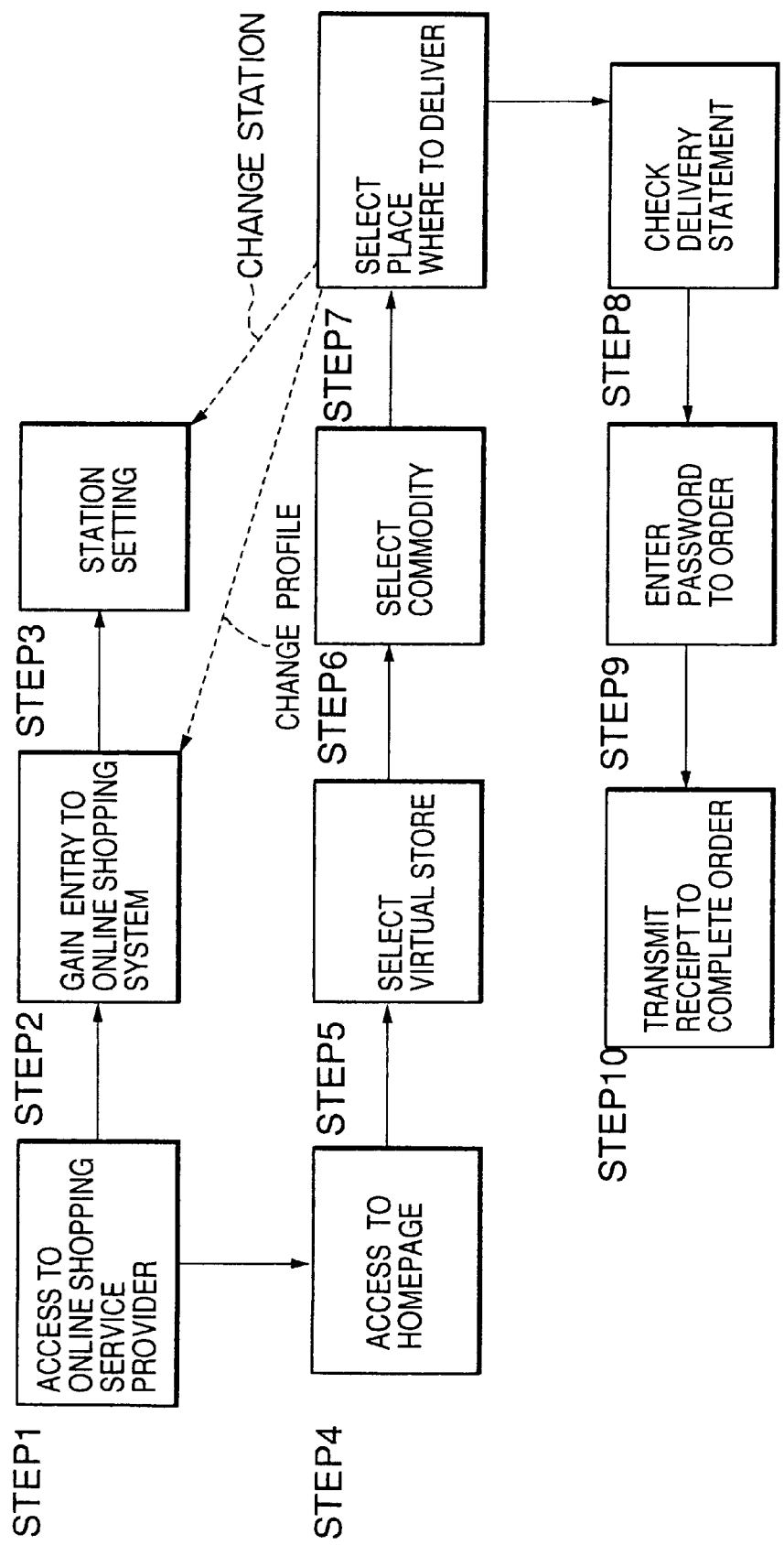
FIG. 2 is a flowchart explaining an operation of the online shopping system.

In FIG. 2, the customer 3 firstly accesses to the online shopping service provider in STEP S1. The process goes to STEP S2 where the customer 3 signs up when he or she gains entry to the online shopping system.

As shown in FIG. 3, the customer 3 enters his or her name, address, telephone number and so on on the screen of the terminal equipment 3a. Member profile change such as a change in home address after entry can be done at this stage.

The process goes to STEP S3, the customer 3 sets or designates stations (24-hour opened convenience stores) to where the customer 3 wants to have commodities delivered on the screen of the terminal equipment 3a as shown in FIG. 4. Station change can be done at this stage.

When the customer 3 sets or changes the station 1 and/or 2, he or she selects one of the states listed on lower part of the screen and clicks SET. FIG. 4 indicates that the customer 3 selects New York. The display on the screen changes to a display as shown in FIG. 5 where the customer 3 selects Manhattan. Then, the customer 3 clicks STATION LIST. Several stations (24-hour opened convenience stores) appear on the screen as shown in FIG. 6 where the customer 3 selects one station and clicks STATION 1 or STATION 2.

In case of shopping, the process goes to STEP 4 from STEP 1 in FIG. 2 where the customer 3 accesses to a homepage of the online shopping service provider.

Figures 7, 8:
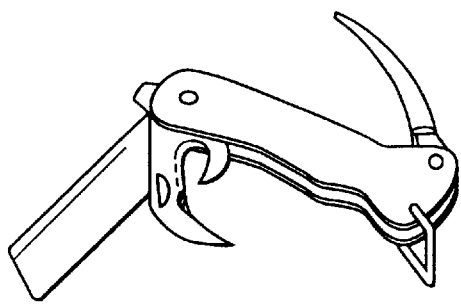
FIG. 7 illustrates a display of a store list on the screen of the customer's terminal equipment.
FIG. 8 illustrates a display of a commodity (virtual store) on the screen of the customer's terminal equipment.

The process then goes to STEP 5 where the store list appears on the screen as shown in FIG. 7. The customer 3 selects one virtual store such as OUTDOOR GEAR. Next, the process goes to STEP 6 where a display as shown in FIG. 8 appears on the screen.

When the customer 3 decides to buy a commodity such as a military knife as shown in FIG. 8, the process goes to STEP 7 where the customer 3 selects a place where he or she wants to have the commodity delivered. Appeared on the screen are the shopping list and delivery place list as shown in FIG. 9. The addresses of the stations 1 and 2, home and office are already set as explained with reference to FIGS. 3 to 6. In case of a gift to the person 10 such as a friend of the customer 3, he or she clicks OTHER and enters the name, address, etc., of the person 10.

According to the invention, although one item (commodity) is shown on the shopping list of FIG. 9, it is easy to make an order of delivery of a plurality of commodities to a plurality of places in STEP S9. In case of change in address, station, etc., the process goes back to STEP S2 or S3.

The process then goes to STEP S8 where the customer 3 checks the delivery statement and clicks ORDER if correct as shown in FIG. 10. The process goes to STEP S9 where the customer 3 checks the sum, enters the password and clicks ORDER as shown in FIG. 11.

The process goes to STEP S10 where the customer 3 records the receipt and clicks OK as shown in FIG. 12 to complete the online shopping.

As disclosed above, according to the present invention, when a customer orders a commodity via a terminal equipment, he or she can select his or her home, office or a 24-hour opened convenience store as the place where he or she wants to have the commodity delivered. The commodity will thus satisfactory be delivered to the customer.

More in detail, if the customer thinks that he or she will be at home (or office) at a delivery time, he or she may select his or her home (or office) address. On the other hand, if the customer thinks that he or she will be absent at a delivery time, he or she may select a 24-hour opened convenience store closest to the place of residence of the customer. The customer thus can get the commodity at any time at the 24-hour opened convenience store.

Furthermore, since a 24-hour opened convenience store will be selected if a customer thinks that he or she will be absent at a delivery time, a home deliverer will deliver a commodity to the convenience store not the customer's home. The customer can get the commodity at any time at the convenience store. Thus, redelivery due to the customer's absence will not occur. And, hence an effective delivery system will be achieved.

What is claimed is:

1. An online shopping system comprising:

a server having a list of data consisting of different locations for different geographical areas on a plurality of stations designated by an on-line shopping service provider, the list having been stored on the server before customers sign up for entering the online shopping system;

at least one virtual store provided on the server, through the virtual store a retailer selling at least a commodity to deliver;

a plurality of pieces of customers' terminal equipment electrically connected to the server, each customer's order for at least one commodity being sold by the retailer through the virtual store being made by each customer's terminal equipment to the server; and a plurality of the stations listed on the server having been designated by the on-line shopping service provider, for temporarily keeping the commodity when ordered by each customer and delivered by the retailer, with each station being a place that is remote from the retailer that sells the commodity ordered through the virtual store, wherein each customer selects one station located at a place that is most convenient for each customer by selecting only from the plurality of stations listed on the server as a place where the commodity ordered by the customer should be delivered from the retailer that sells the ordered commodity through the virtual store and as a place where the customer can pick up the ordered commodity any time when the customer orders the commodity via the customer's terminal equipment, information indicating the one station selected by the customer being sent to the server as the station that is selected by the customer.

2. An online shopping system comprising:

a server having a list of data consisting of different locations for different geographical areas on a plurality of stations designed by a on-line shopping service provider, the list having been stored on the server before customers sign up for entering the online shopping system;

at least one virtual store provided on the server, through the virtual store a retailer selling at least a commodity to deliver;

a plurality of pieces of customers' terminal equipment electrically connected to the server, each customer's order for at least one commodity being sold by the retailer through the virtual store being made by each customer's terminal equipment to the server; and a plurality of the stations listed on the server having been designated by the on-line shopping service provider, for temporarily keeping the commodity when ordered by each customer and delivered by the retailer, with each station being a place that is remote from the retailer that sells the commodity ordered through the virtual store, wherein order information transmitted from each customer's terminal equipment to the server when the order is made includes delivery place information indicating a place selected by the customer as a place where the commodity ordered by the customer should be delivered from the retailer that sells the ordered commodity through the virtual store, the delivery place information indicating at least either one of the customer's place of residence, the customer's selected place, the customer's selected person's place of residence or one station located at a place that is most convenient for the customer and only selected from the plurality of stations listed on the server as a place where the customer can pick up the ordered commodity any time the delivery place information indicating a place to which the ordered commodity should be delivered being sent to the server.

3. An online shopping system according to claim 2, wherein the order information is transmitted from the server to another piece of terminal equipment belonging to an owner of the virtual store.

4. An online shopping system according to claim 3, wherein the terminal equipment belonging to the owner of the virtual store is capable of printing out a statement of delivery indicating the order information.

5. An online shopping system according to claim 2, wherein the order information includes information indicating the commodity.

6. An online shopping system according to claim 2, wherein the order information includes information indicating an amount of commodities.

7. An online shopping system according to claim 1, wherein the online shopping service provider issues customer identification for picking up the ordered commodity at the station.

8. An online shopping system according to claim 2, wherein the online shopping service provider issues customer identification for picking up the ordered commodity at the station.

9. An online shopping system comprising:

a server having an area list of data on a plurality of areas, and a station list of data consisting of different locations for different geographical areas on a plurality of stations located in each area and designated by an on-line shopping service provider, and a delivery place list of a plurality of delivery places, the lists having been stored on the server before customers sign up for entering the online shopping system;

at least one virtual store provided on the server, through the virtual store a retailer selling at least a commodity to deliver;

a plurality of pieces of customers' terminal equipment electrically connected to the server, each customer's order for at least one commodity to be sold by the retailer through the virtual store being made by each customer's terminal equipment to the server, and each customer only selecting, via each customer's terminal equipment, one area from the area list and one station in the selected area from the station list; and a plurality of the stations listed on the server having been designated by the on-line shopping service provider as a place where the commodity ordered by the customer should be delivered from the retailer that sells the ordered commodity through the virtual store and as a place where the customer can pick up the ordered commodity any time and also as a place that is different from the retailer that sells the ordered commodity through the virtual store, and at least one station located at a place that is convenient for the customer being selected by the customer from the station list, wherein when the customer orders the commodity via the customer's terminal equipment, the customer selects a delivery place of the ordered commodity from the delivery place list that lists delivery places including at least one station selected by the customer.

10. An online shopping system according to claim 9, wherein the delivery place list that lists the delivery places including at least one station selected by the customer, the customer's place of residence, the customer's selected place and an icon for changing a screen for entering the customer's selected person's place of residence.

11. A method of online shopping through an online shopping system having a server of an online shopping service provider, at least one virtual store provided on the server, through the virtual store a retailer selling at least a commodity to deliver; and a plurality of pieces of customers' terminal equipment electrically connected to the server, the method comprising the steps of:

entering a member profile including customer's name and address by the customer's terminal equipment accessing the server;

displaying an area list listing data on a plurality of areas on the customer's terminal equipment, the area list having been stored on the server before entering the member profile;

selecting one area from the displayed area list;

displaying a station list listing data consisting of different locations for different geographical areas on a plurality of stations in the selected area, on the customer's terminal equipment, the station list having been stored on the server before entering the member profile, each station having previously been designated by the on-line shopping service provider as a place where the commodity ordered by the customer should be delivered from the retailer that sells the ordered commodity through the virtual store and as a place where the customer can pick up the ordered commodity any time and also as a place that is different from the retailer that sells the ordered commodity through the virtual store;

selecting one station located at a place that is convenient for the customer from only the station list being displayed on the customer's terminal equipment;

transmitting order information for at least one commodity being sold by the retailer through the virtual store from the customer's terminal equipment to the server;

displaying a delivery place list that lists delivery places including at least one station selected by the customer and the customer's place of residence on the customer's terminal equipment; and selecting a delivery place of the ordered commodity from the delivery place list displayed on the customer's terminal equipment.

12. A method of online shopping according to claim 11, further comprising the step of transmitting date information indicating when the commodity has been delivered to the station, from the server to the customer's terminal equipment, in the case where the customer selects the station as the delivery place of the ordered commodity.

* * * * *